N. A. DEDERER.
Harvester.
No. 52,395.
Patented Feb. 6, 1866.
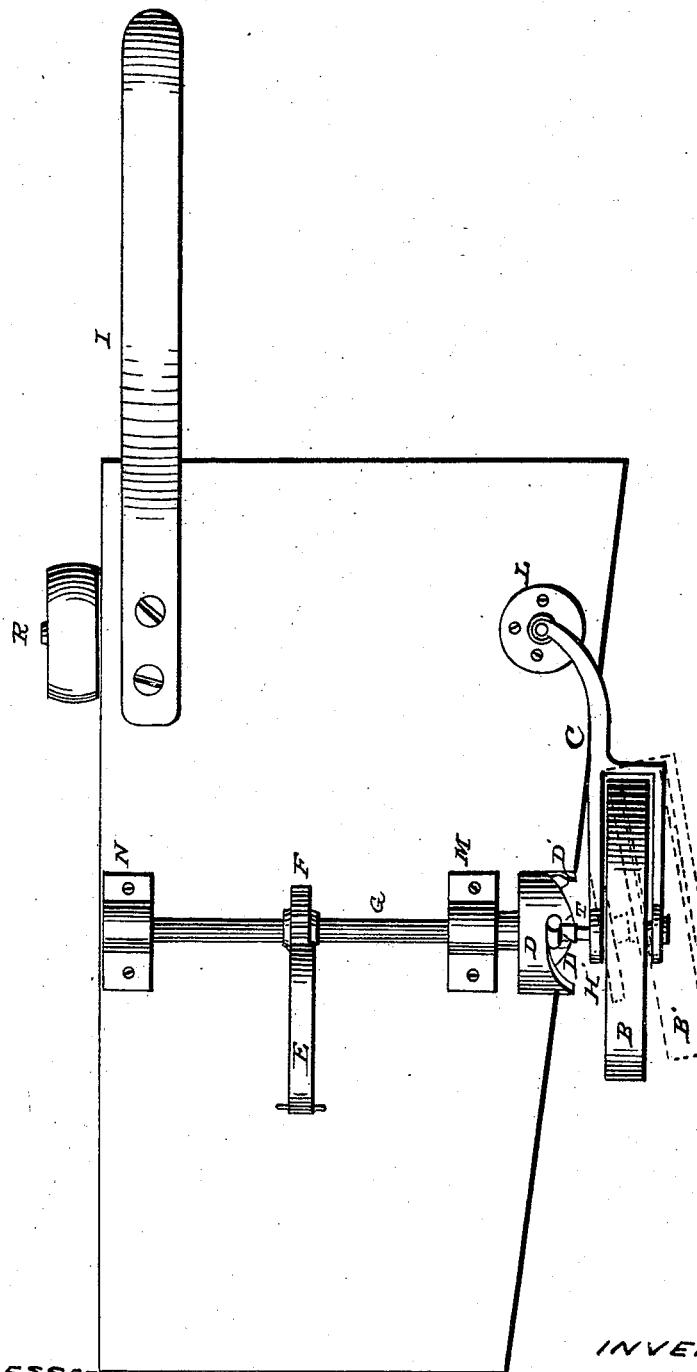
WITNESSES.
R Mason
L. Murphy
INVENTOR.
N. A. Dederer
D P Holloway & Co
his attorneys

UNITED STATES PATENT OFFICE.

NICHOLAS A. DEDERER, OF GREENE, NEW YORK.

IMPROVEMENT IN HARVESTING-MACHINES.

Specification forming part of Letters Patent No. 52,395, dated February 6, 1866.

*To all whom it may concern:*

Be it known that I, NICHOLAS A. DEDERER, of Greene, in the county of Chenango and State of New York, have invented a new and improved method of communicating power to an automatic rake so as to disengage the rake when turning the reaping-machine, and for other purposes, of which the following is a full, clear, and exact description of the same, showing the construction and operation, reference being had to the accompanying drawing, which is made part of this specification.

The drawing shows a plan of the same.

A is a section of the platform of a reaping-machine. B is a caster-wheel revolving upon an axis having its bearings on both sides of the wheel in the arms of the bifurcated bar C, which is pivoted upon the platform by the standard L, upon which it turns freely horizontally. The axis of the wheel B is extended a few inches inward, and has attached to its extremity the cross-bar H.

Both the axle and the cross-bar should be made of wrought-iron. The shaft G, working in two boxes, M and N, has keyed upon its outer extremity the clutch D. This clutch has on its outer edge four projecting hook-shaped teeth, D', the outer side of which forms an inclined plane, and the inner has a sufficient space to receive the cross-bar H, left between it and the outer side. On the shaft G is placed the ratchet-wheel F, into which works the ratchet E, permitting the shaft to revolve only forward.

The arrangement shown in the drawing is especially adaptable to my automatic rake, a patent for which has been ordered, but has not yet issued. I claim, however, the device wherever applicable to other machines by modifications in the attachments not altering the peculiar characteristics of my invention.

In operating a harvester with this attachment when the machine is moving forward in a right line, cutting, say, to the right, the bar C hangs parallel to the frame of the machine. The cross-bar H seizes the hooks in the clutch D, as shown in the drawing, and gives with the revolution of the wheel a forward impulse to the shaft G. When the machine arrives at a corner to be turned to cut another face of the standing grain, backing the machine slightly, the shaft being retained by the ratchet, the bar A rising upon the inclined side of the notches is thrown out of gear. The machine being turned to the right, the wheel swings upon the pivot L, as shown by the red lines B' and H'. The turn being completed, the machine is put in forward motion in a right line, the caster-wheel swings into gear with the clutch, and the automatic movement of the rake is recommenced.

I and K form no part of my invention.

Having thus explained the nature and operation of my invention, what I claim as my invention, and seek to secure by Letters Patent, is—

1. In a reaping-machine, an auxiliary wheel running upon the ground and swinging by an arm from a pivot and communicating motion to an auxiliary driving-shaft whenever the machine is moving directly to the front, and automatically disengaging itself from the shaft when the machine is being turned by means of a clutch upon the end of the shaft, substantially as and for the purposes set forth.

2. The combination of the wheel B, with its attachments C, L, and H, the clutch D, and ratchet and pinion E F, substantially as and for the purpose set forth.

In testimony whereof I have signed my name to this specification in the presence of two subscribing witnesses.

NICHOLAS A. DEDERER.

Witnesses:
  PETER B. RATHBONE,
  J. G. REYNOLDS.